(12) United States Patent
Foshee et al.

(10) Patent No.: US 9,773,391 B1
(45) Date of Patent: Sep. 26, 2017

(54) OBJECT DETECTION DEVICE

(71) Applicants: George Brandon Foshee, Magnolia, AR (US); Timothy Allen Zigler, Crown King, AR (US)

(72) Inventors: George Brandon Foshee, Magnolia, AR (US); Timothy Allen Zigler, Crown King, AR (US)

(73) Assignee: FAUXSEE INNOCATIONS, LLC, Magnolia, AR (US)

( * ) Notice: Subject to any disclaimer, the term of this patent is extended or adjusted under 35 U.S.C. 154(b) by 0 days.

(21) Appl. No.: 14/337,192

(22) Filed: Jul. 21, 2014

Related U.S. Application Data

(63) Continuation-in-part of application No. 13/588,296, filed on Aug. 17, 2012, now Pat. No. 8,803,699.

(60) Provisional application No. 61/524,919, filed on Aug. 18, 2011, provisional application No. 61/604,241, filed on Feb. 28, 2012.

(51) Int. Cl.
*G08B 21/00* (2006.01)
*G08B 21/02* (2006.01)
*G08B 21/18* (2006.01)

(52) U.S. Cl.
CPC ........... *G08B 21/02* (2013.01); *G08B 21/182* (2013.01)

(58) Field of Classification Search
CPC .............................. G08B 21/02; G08B 21/182
USPC ..... 340/691.1–691.3, 539.23, 539.11, 686.1, 340/686.6; 135/65; 434/112, 113
See application file for complete search history.

(56) References Cited

U.S. PATENT DOCUMENTS

| | | | | |
|---|---|---|---|---|
| 3,654,477 A | * | 4/1972 | Benjamin, Jr. | A61F 9/08 250/221 |
| 3,993,407 A | * | 11/1976 | Moricca | A61H 3/061 250/222.1 |
| 5,508,699 A | * | 4/1996 | Silverman | A61H 3/061 340/4.14 |
| 5,982,286 A | * | 11/1999 | Vanmoor | G01S 15/04 340/573.4 |
| 6,298,010 B1 | * | 10/2001 | Ritz | A61H 3/061 367/116 |
| 6,430,450 B1 | * | 8/2002 | Bach-y-Rita | A61F 9/08 379/52 |
| 6,977,579 B2 | * | 12/2005 | Gilfix | A61H 3/061 340/407.1 |
| 7,159,008 B1 | * | 1/2007 | Wies | G06F 3/01 709/203 |
| 7,267,281 B2 | * | 9/2007 | Hopkins | A61H 3/061 135/911 |

(Continued)

FOREIGN PATENT DOCUMENTS

IT  WO 9717043 A1 * 5/1997 .............. A61F 9/08

*Primary Examiner* — Eric M Blount
(74) *Attorney, Agent, or Firm* — Schrantz Law Firm, PLLC; Stephen D. Schrantz

(57) ABSTRACT

When the sight impaired become mobile, they often bump their heads on unseen objects and/or hazards that could result in injury. The object detection device uses signal emitting proximity sensors that alert the user to unseen objects. The object detection device notifies the user of detected objects. Stimulators, such as actuators, produce a detected feedback to contact the user to warn the user that an object has been detected and the distance between the object and the user. Each actuator contacts the user at a specific contact point. The actuator contacting the user at a specific contact point informs the user of the distance between the user and the detected object.

5 Claims, 16 Drawing Sheets

(56) References Cited

U.S. PATENT DOCUMENTS

| | | | | |
|---|---|---|---|---|
| 7,755,744 B1* | 7/2010 | Leberer | ............... | G01C 3/08 |
| | | | | 356/5.1 |
| 7,778,112 B2* | 8/2010 | Behm | ............... | A61H 3/061 |
| | | | | 135/911 |
| 8,316,166 B2* | 11/2012 | Grant | ............... | G06F 3/016 |
| | | | | 340/7.6 |
| 9,201,143 B2* | 12/2015 | Slamka | ............... | G01C 21/165 |
| 2007/0016425 A1* | 1/2007 | Ward | ............... | A61H 3/061 |
| | | | | 704/271 |

\* cited by examiner

OBJECT DETECTION DEVICE

CROSS-REFERENCE TO RELATED APPLICATIONS

This application claims priority to and is a continuation-in-part of U.S. patent application Ser. No. 13/588,296 entitled OBJECT DETECTION DEVICE filed on Aug. 17, 2012 which claims priority to and is a continuation in part of U.S. Patent Application No. 61/524,919 filed on Aug. 18, 2011 entitled DEVICE TO AID THE BLIND BY ALERTING THE USER OF UNSEEN OBSTACLES and also claims priority to and is a continuation-in-part of U.S. Patent Application No. 61/604,241 filed on Feb. 28, 2012 entitled FAUXSEE GLASSES.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

This invention relates generally to an object detection device that alerts users to objects in the vicinity of the user. More specifically, the object detection device provides a frame placed on the user's head. Multiple adjustable fingers mounted on the frame adjust between a detected position and a clear position. The adjustable fingers in the detected position notify the user that an object has been detected at a specific region. The adjustable fingers in the clear position notify the user that an object has not been detected at a specified region. The object detection device also notifies the distance between the detected object and the user.

DESCRIPTION OF THE KNOWN ART

Patents and patent applications disclosing relevant information are disclosed below. These patents and patent applications are hereby expressly incorporated by reference in their entirety.

U.S. Pat. No. 3,383,682 issued to Stephens on May 14, 1968 ("the '682 patent") teaches a navigational method and apparatus for blind persons incorporated in a pair of eye glasses, at least one temple portion of which comprises a directional antenna for both transmitting and receiving signals and a heel portion of which contains a single circuitry unit to generate signals at a predetermined frequency and receive and amplify echoed signals having frequencies different from the transmitted frequency. The '682 patent also teaches a detectable warning system connected into the receiving and amplifying circuitry unit communicates the amplified signal to the person using the apparatus.

U.S. Pat. No. 3,654,477 issued to Benjamin on Apr. 4, 1972 ("the '477 patent") teaches an obstacle detection device for the blind. The '477 patent teaches that a light source is pulsed on to produce a pulse of light which is reflected by an obstacle. The reflected light taught by the '477 patent is received adjacent the coherent light source and the time between the transmission and reception of the pulse is used to measure the relatively short distances involved. The '477 patent also teaches a tactile stimulator directed to a sensitive body area supported on the same frame employs material which changes shape when temperature exceeds a critical level and returns to its original shape when cooled below that temperature such that internal resistance of the material under the effect of AC current constantly cyclically changes above and below the critical temperature.

The known art only notifies a user than an object is present. The known art does not provide a system that uses physical contact to alert users of the distance between the user and the object. Therefore, the present invention is needed to improve the information provided to the user. The present invention communicates the distance between the user and the object. The present invention is also needed to improve the user's navigation through an area. The present invention is also needed to alert users of objects in multiple directions.

SUMMARY OF THE INVENTION

One embodiment of the object detection device may be used by the visually impaired to inform the user of objects that are at or near the user's head. Currently, the two major advances in technology to aid the mobility of the visually impaired are the cane and the guide dog. Both the cane and the guide dog are designed to protect the user from tripping hazards and/or lower body injury. The present invention may be used in conjunction with such devices to give the user a safer experience and more protection for the user's upper body while in motion.

The object detection device of the present invention alerts users to objects in the vicinity of the user. The object detection device helps the visually impaired detect and navigate around obstacles. Stimulators of the present invention contact the user at different contact points to inform the user of the proximity of the detected objects. The object detection device also informs users of objects that may not have been detected by the user. One embodiment of the object detection device is designed to be worn on a user. Different embodiments may be worn on a user's head, clothing, belt, arm bands, or otherwise attached to the user. Other embodiments may be implemented in vehicles to inform users of objects in close proximity to the vehicle.

Such an embodiment provides a housing that may be worn by the user. The housing may be attached to the user's clothing, a hat, or may be installed on a pair of glasses to be placed on the user's head. Multiple stimulator fingers mounted on the frame adjust between a detected position and a clear position. The stimulator fingers in the detected position notify the user that an object has been detected at a specific region. The stimulator fingers in the clear position notify the user that an object has not been detected at a specified region. The object detection device also notifies the distance between the detected object and the user. The stimulators contact the user at different contact points to notify the user of the distance of the object.

It is an object of the present invention to notify users of the location and distance of a detected job.

It is another object of the present invention to alert users of potential dangers.

It is another object of the present invention to inform users of distances to detected objects.

It is another object of the present invention to provide users with advanced notice of a detected object.

It is another object of the present invention to make contact with users at different contact points to inform users of the distances of detected objects.

It is another object of the present invention to inform the user of the speed at which an object approaches a user.

It is another object of the present invention to inform the user of the speed at which the user approaches an object.

It is another object of present invention to notify the user whether an object detected favors the user's left, right, or both.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

The object detection device of the present invention may be used by the visually impaired to inform the user of objects that are at or near the user. The object detection device is generally shown as 100. The object detection device 100 alerts users to objects in the vicinity of the user. The object detection device 100 is designed to be worn on a user. Different embodiments may be worn on a user's head, clothing, belt, arm bands, or otherwise attached to the user. Other embodiments may be implemented in vehicles to inform users of objects in close proximity to the vehicle. The object detection device informs users of objects that may not have been detected by the user.

The object detection device 100 uses at least one sensor 102, 104 for detecting objects. Sensors 102, 104 may be an electronic component that can both send and/or receive signals. Such sensors of the present invention may include but are not limited to ultrasonic, infrared, electromagnetic, laser, or any other device and/or system capable of sending and receiving signals for the purpose of detecting objects. In one embodiment, the sensor can relate the proximity of the object to the user with the application of voltage. Other embodiments of the sensors 102, 104 may produce signals in a non-ultrasonic wave, such as infrared or laser, for gathering information such as heat detection or metal objects to provide the user with more information about the user's surroundings. The sensors may also be a combination of the above mentioned sensors.

The object detection device 100 may also include additional sensors that perform task specific functions, including but not limited to wide beam sensors and narrow beam sensors. The wide beam sensors detect a broader field for obstacles or lack thereof. A narrow beam sensor could be used for pinpointing obstacles. In a similar manner, a single sensor could gather the information. The stimulator control analyzes the information from the sensor to determine the positioning (right, left, front, rear, etc.), pinpointing, object size, etc.

In another embodiment, the object detection device may include a camera in communication with a computing device. Such an embodiment may implement face recognition and object recognition software to provide the user with additional information regarding the detected objects. Such additional features would also allow the user to use money recognition software so that the user can recognize the currency. The object detection device may also include a microphone to capture audio. The object detection device could capture audio to convert speech to text via a dictation application.

Figure 1:
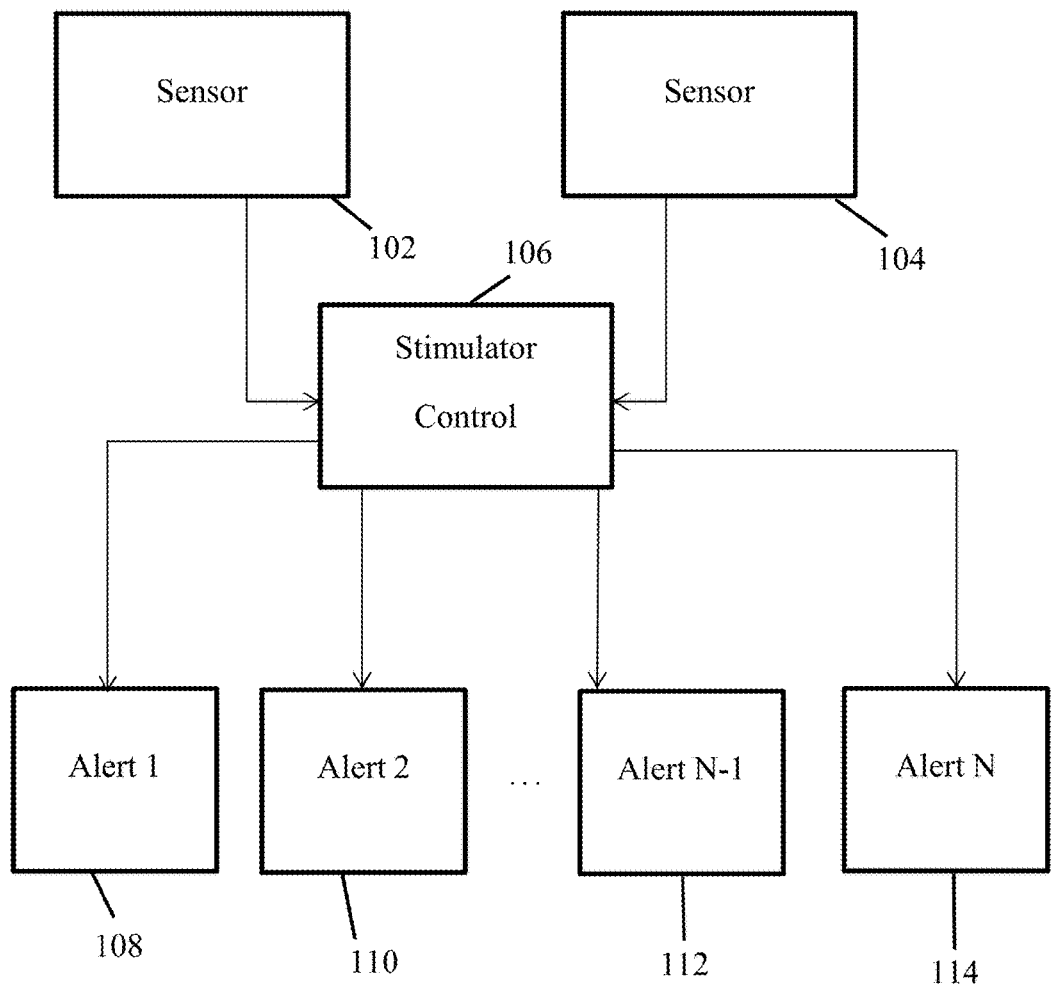
FIG. 1 is a schematic view of one embodiment of the present invention.

FIG. 1 shows a number of components of the object detection device 100. The sensors may include known sensors, such as back up sensors found on automobiles. Each sensor sends and receives signals to detect objects to determine the distance between the detected object and the sensor. In one embodiment, each sensor may control at least one alert system. In another embodiment, one sensor may control multiple alert systems. The sensors 102, 104, communicate with a stimulator control 106. The stimulator control 106 may include, but is not limited to, a processor, a circuit board, a smart phone, a computer, or other computing device. The stimulator control 106 processes the information from the sensors to activate the appropriate alert systems. The use of a smart phone or computing device may provide the user with increased functionality such as additional computing power, the use of GPS features, and other applications such as face recognition, color recognition, object recognition, and money recognition.

The stimulator control 106 is also in communication with at least one alert system 108, 110, 112, 114. The stimulator control 106 provides signals to the alert system 108, 110, 112, 114 to activate the appropriate alert system 108, 110, 112, 114. Multiple alert systems 108, 110, 112, 114 may be utilized by the object detection device 100. The stimulator control 106 activates specific alert systems when the objects are within the designated range. The sensors, stimulator control, and alert systems may be hard wired together or may communicate wirelessly.

The object detection device 100 also includes a power supply such as batteries or a rechargeable power source. The object detection device 100 preferably uses a portable power source. In another embodiment, the object detection device 100 uses a wired power source.

Figure 2:
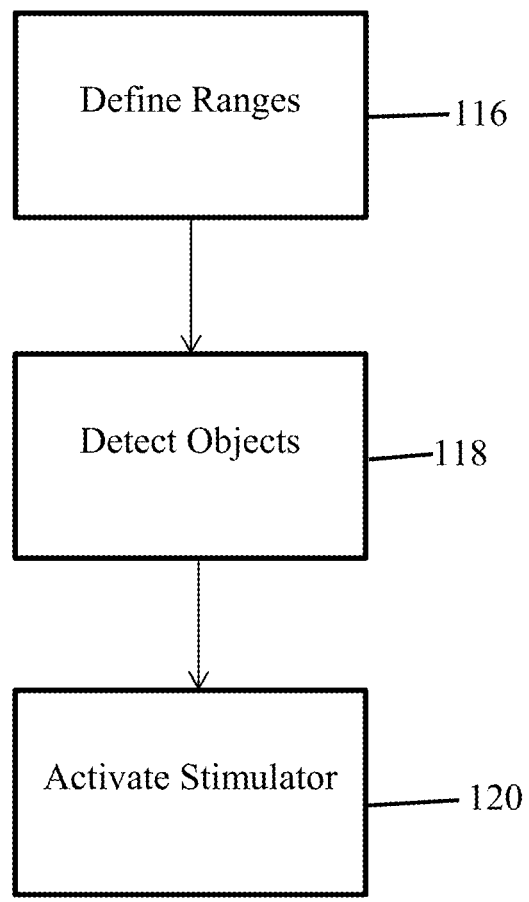
FIG. 2 is a flowchart showing one process of one embodiment of the present invention.
Figure 3:
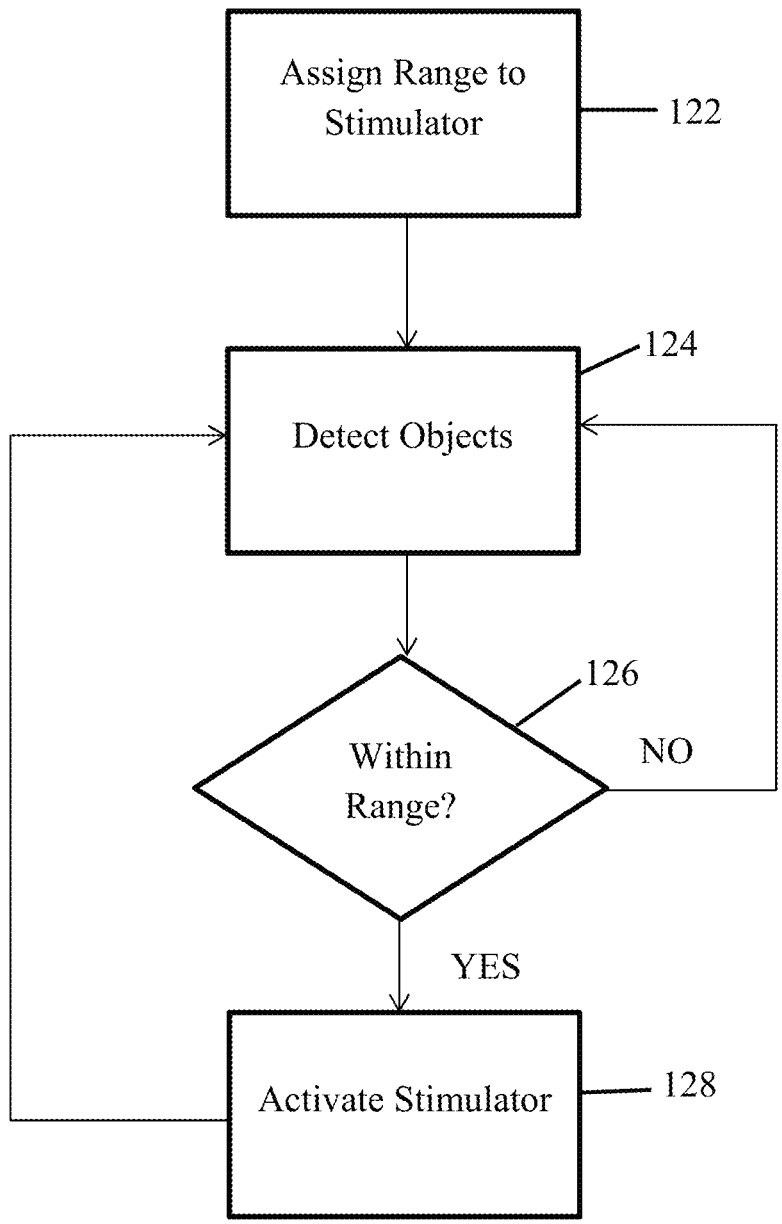
FIG. 3 is a flowchart showing one process of one embodiment of the present invention.

FIGS. 2 and 3 show the operation of the object detection device 100. To provide information to the user, the ranges of the object detection device 100 are defined at Define Ranges Step 116. Each alert system may be constructed from multiple stimulators. The number of stimulators can range from at least one mobile stimulator to multiple stimulators. In one embodiment, the stimulators may be constructed from servo motors, solenoids, and/or Linear Resonator Actuators (LRAs). The alert system of one embodiment may be constructed from five stimulators located along the stems of a pair of glasses.

Each stimulator finger alerts a user that an object has been detected within a certain distance from the user. A stimulator finger of each stimulator adjusts between a detected position and a clear position. The stimulator finger in the detected position informs the user that an object has been detected within a specific range from the user. The stimulator finger in the clear position informs the user that no object has been detected within a specific range from the user.

In one embodiment, the stimulator finger alerts the user that an object has been detected by contacting the user at defined contact points. Each contact point is assigned a distance range. One embodiment of the present invention utilizes a stimulator located at each contact point. Another embodiment utilizes a stimulator transport that moves the stimulator to the contact point.

For example, in one embodiment constructed with five stimulators located at five different contact points, the object detection device begins warning a user that the user is within five feet from an object. In such an embodiment, the first contact point is defined at five feet. Each additional contact point is defined at one foot increments. For example, the second contact point is defined at four feet. The third contact point is defined at three feet. The fourth contact point is defined at two feet, and the fifth contact point is defined at one foot. Each stimulator finger adjusts to the detected position at the defined contact point when an object is detected within the range designated for the stimulator, actuator, and/or stimulator finger. For example, if an object is detected at three feet away from the user, the stimulator located at the third contact point will be activated to contact the person at the third contact point. In one embodiment, only the stimulator finger at the third contact point is adjusted to the detected position. In another embodiment, the stimulator fingers located at the first, second, and third contact points are adjusted to the detected position as an object is detected within five, four, and three feet away.

While only one set of contact points may be defined, the present invention may also include multiple modes in which different ranges are defined for the contact points. One embodiment of the present invention could include, but not be limited to, three modes. The first mode could be an outdoor mode which would detect a longer field of view which could begin notifying users that an object has been detected twelve feet away. In open spaces, a longer detection field would be ideal due to the fact that fewer obstacles are expected to be found in wide open spaces. In addition, these obstacles found in open spaces will be located further apart. The outdoor mode will give the user more reaction time to make navigation decisions based on the results of the real time information given to the user.

The second mode of operation, an indoor mode, could begin notifying users that an object has been detected six feet away. Because the indoor mode is providing information on a smaller distance range, each contact point provides information regarding a smaller distance increment. Therefore, the indoor mode allows the user to gather more detailed information as each contact point represents a smaller distance range.

The third mode of operation, a pinpoint mode, would broadcast a smaller field of view, preferably but not limited to, an eight inch diameter field of view at a distance of about four feet. The pinpoint mode provides the user with more detailed information about a single object to give the user a sense of topography of the object. In the pinpoint mode, the range has been decreased to allow the system to alert the user of slight anomalies, such as a place setting at a table.

The user may customize the ranges of the contact points according to the user's needs. The user may define an alert distance to customize when the object detection device will begin alerting the user. The alert distance may then be divided equally among the contact points to define the distance increments associated with each contact point. The stimulator control will then activate the stimulator at the contact point to alert the user of the distance of the detected object. For example, each contact point could be assigned a range according to the following formula:

Range of contact point=Alert Distance/Number of Contact Points.

In an object detection device constructed of five stimulators, the range of a contact point when detecting an alert distance of fifteen feet will be assigned three feet increments. Likewise, the range of a contact point when detecting an alert distance of ten feet will be assigned two feet increments. The range of a contact point when detecting an alert distance of five feet will be assigned one foot increments.

Table for fifteen feet alert distance with five stimulators and three feet increments. Activating multiple stimulators.

| Stimulator Contact Point Number | Minimum Distance To Activate to Detected Position | Maximum Distance |
| --- | --- | --- |
| 1 | 0 | 15 |
| 2 | 0 | 12 |
| 3 | 0 | 9 |
| 4 | 0 | 6 |
| 5 | 0 | 3 |

Table for ten feet alert distance with five stimulators and two feet increments. Activating multiple stimulators.

| Stimulator Contact Point Number | Minimum Distance To Activate to Detected Position | Maximum Distance |
| --- | --- | --- |
| 1 | 0 | 10 |
| 2 | 0 | 8 |
| 3 | 0 | 6 |
| 4 | 0 | 4 |
| 5 | 0 | 2 |

Table for five feet alert distance with five stimulators and one foot increments. Activating multiple stimulators.

| Stimulator Contact Point Number | Minimum Distance To Activate to Detected Position | Maximum Distance |
|---|---|---|
| 1 | 0 | 5 |
| 2 | 0 | 4 |
| 3 | 0 | 3 |
| 4 | 0 | 2 |
| 5 | 0 | 1 |

Table for fifteen feet alert distance with five stimulators and three feet increments. Activating only one stimulator contact point.

| Stimulator Contact Point Number | Minimum Distance To Activate to Detected Position | Maximum Distance |
|---|---|---|
| 1 | >12 | 15 |
| 2 | >9 | 12 |
| 3 | >6 | 9 |
| 4 | >3 | 6 |
| 5 | 0 | 3 |

Table for ten feet alert distance with five stimulators and two feet increments. Activating only one stimulator contact point.

| Stimulator Contact Point Number | Minimum Distance To Activate to Detected Position | Maximum Distance |
|---|---|---|
| 1 | >8 | 10 |
| 2 | >6 | 8 |
| 3 | >4 | 6 |
| 4 | >2 | 4 |
| 5 | 0 | 2 |

Table for five feet alert distance with five stimulators and one foot increments. Activating only one stimulator contact point.

| Stimulator Contact Point Number | Minimum Distance To Activate to Detected Position | Maximum Distance |
|---|---|---|
| 1 | >4 | 5 |
| 2 | >3 | 4 |
| 3 | >2 | 3 |
| 4 | >1 | 2 |
| 5 | 0 | 1 |

In another embodiment, the user customizes the contact points for any desired range. The user may program different increments for each contact point. The user may program the stimulator control. In other embodiments, the user may be provided with a stimulator/actuator control with the desired ranges preprogrammed to the user's needs and customization.

Continuing to refer to FIG. 2, the object detection device, when powered on, detects objects at Detect Objects Step 118. The sensors search for objects. If an object is detected, sensor sends information to the stimulator control 106 informing the stimulator control 106 of the object. If the detected object is within the designated range, the stimulator control 106 activates the associated stimulator to notify the user that an object has been detected at Activate Stimulator Step 120.

FIG. 3 provides more detailed information regarding the process. The stimulator is assigned a range as described above at Assign Range Step 122. The sensors then begin to detect objects at detect objects 124. Known sensors and detection systems may be used in the present invention.

The object detection device emits a signal to determine the distance of any objects in the user's natural field of vision. The sensor measures the time for the signal to be emitted and return. Given the time required for the signal to return, the stimulator controller or other computing device can determine distance between the sensor and the object.

As the sensor detects an object, the sensor provides the information to the stimulator control 106 to determine whether the object is within range at Within Range Query 126. If the object is within the appropriate range, the stimulator control 106 activates the appropriate stimulator at Activate Stimulator 128. The stimulator control 106 of an embodiment using multiple stimulators determines which stimulators should be activated. Each of these stimulators is located at a different contact point. The stimulator control 106 activates the appropriate stimulators according to the location of the detected object. In another embodiment using a stimulator transport, the stimulator control 106 positions the stimulator to the appropriate contact point. The stimulator is moved in position on the user according to the location of the object as will be discussed below.

Figure 4:
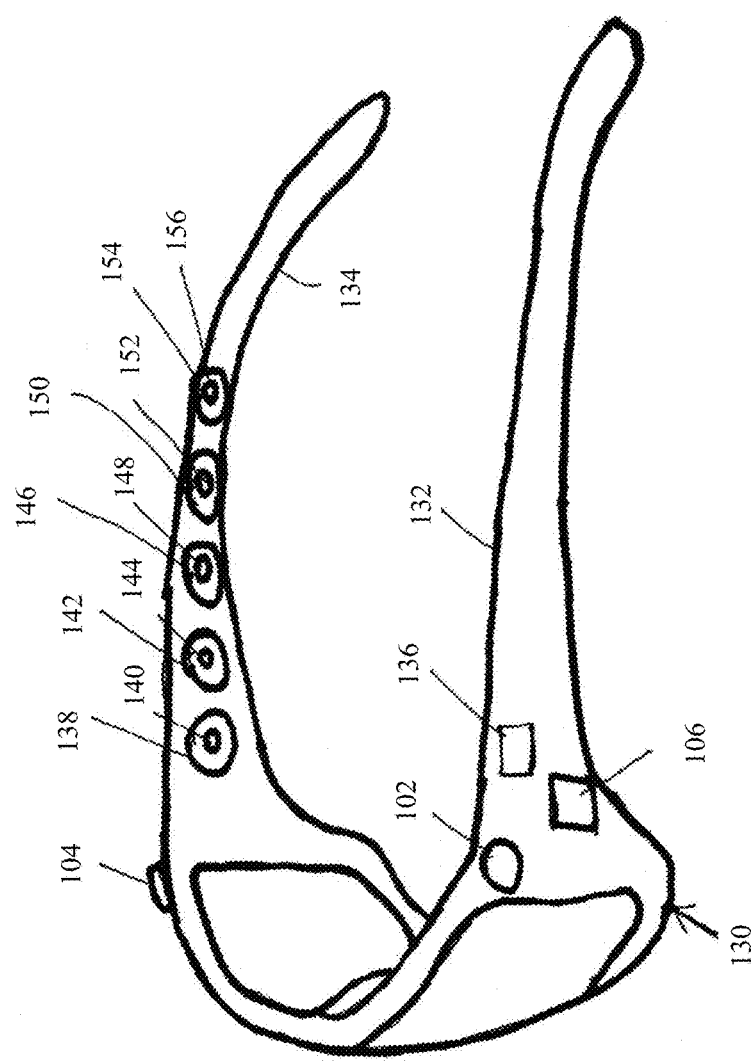
FIG. 4 is a perspective view of one embodiment of the present invention.

FIG. 4 shows a perspective view of one embodiment of the present invention in which the sensors 102, 104 and stimulators 138, 142, 146, 150, 154 are installed on a pair of glasses 130. Sensors 102, 104 are located at the front of the glasses to detect objects in the user's field of vision. A power toggle 136 allows the user to power on and off the object detection device 100. The stimulator control 106 located on the glasses communicates with the sensors 102, 104 to activate the appropriate stimulators 138, 142, 146, 150, 154.

Figure 5:
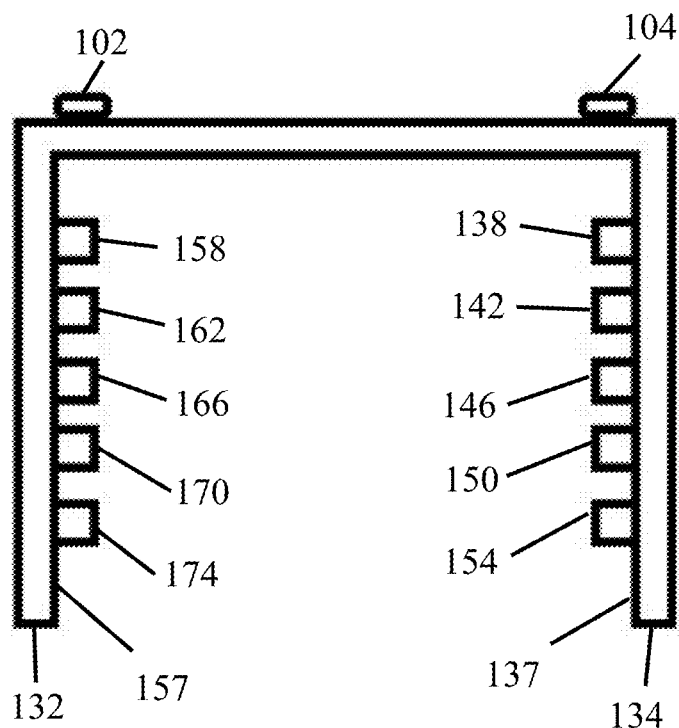
FIG. 5 is a top view of one embodiment of the present invention.

Referring to FIGS. 4-5, stimulators 138, 142, 146, 150, 154, 158, 162, 166, 170, 174 are located along stems 132, 134 of glasses 130. Each stimulator is located along a path from the front of the stem 134 towards the temple to the rear of the stem 134 towards the ear. Each stimulator provides a stimulator finger, such as stimulator fingers 140, 144, 148, 152, 156, 160, 164, 168, 172, 176. Each stimulator finger adjusts between a detected position and a clear position. The stimulator control 106 activates the stimulators to adjust the stimulator fingers between the detected position and the clear position.

The stimulators may belong to a stimulator set that provides the user with information regarding the distance of the detected object to the sensor. FIGS. 5-10 show stimulator set 137 constructed from stimulators 138, 142, 146, 150, 154 and stimulator set 157 constructed from stimulators 158, 162, 166, 170, 174.

Each stimulator set 137, 157 informs the user of the distance to the detected object. The stimulators of each stimulator set form a path from the front of stems 132, 134 to the rear of stems 132, 134. In one embodiment, the each stimulator is assigned a distance range having a maximum distance and a minimum distance. Each stimulator adjusts its stimulator finger to the detected position when an object has been detected within the distance range of the stimulator. In one embodiment, the minimum distance of each distance range may be equal as described herein. The minimum distance of another embodiment may differ as described herein.

The maximum distances of each distance range should vary to provide the user with information regarding the distance to the detected object. For example, in one embodiment of a stimulator set 137, the maximum distance of stimulator 138 will be greater than stimulators 142, 146, 150, 154. The maximum distance of stimulator 142 will be greater than stimulators 146, 150, 154. The maximum distance of stimulator 146 will be greater than stimulators 150, 154. The maximum distance of stimulator 150 will be greater than stimulator 154. In this embodiment, stimulator 138 activates at the farthest distance and stimulator 154 activates at the closest distance. Each stimulator sequentially activates to adjust the associated stimulator finger to the detected position until the last stimulator 154 activates. Therefore, as a user approaches an object, the stimulators will activate sequentially starting at stimulator 138 to stimulator 142 to stimulator 146 to stimulator 150 to stimulator 154. As a user backs away from an object, the stimulators will activate sequentially starting at stimulator 154 to stimulator 150 to stimulator 146 to stimulator 142 to stimulator 138. Stimulator set 157 may be configured the same as stimulator set 137. In another embodiment, the stimulator sets may vary.

In another embodiment, the path of the stimulator set may be reversed from the path described above. In such an embodiment, the maximum distance of stimulator 138 will be less than stimulators 142, 146, 150, 154. The maximum distance of stimulator 142 will be less than stimulators 146, 150, 154. The maximum distance of stimulator 146 will be less than stimulators 150, 154. The maximum distance of stimulator 150 will be less than stimulator 154. In this embodiment, stimulator 154 activates at the farthest distance and stimulator 138 activates at the closest distance. Each stimulator sequentially activates to adjust the associated stimulator finger to the detected position until the last stimulator 138 activates. Therefore, as a user approaches an object, the stimulators will activate sequentially starting at stimulator 154 to stimulator 150 to stimulator 146 to stimulator 142 to stimulator 138. As a user backs away from an object, the stimulators will activate sequentially starting at stimulator 138 to stimulator 142 to stimulator 146 to stimulator 150 to stimulator 154. Stimulator set 157 may be configured the same as stimulator set 137.

Figure 6:
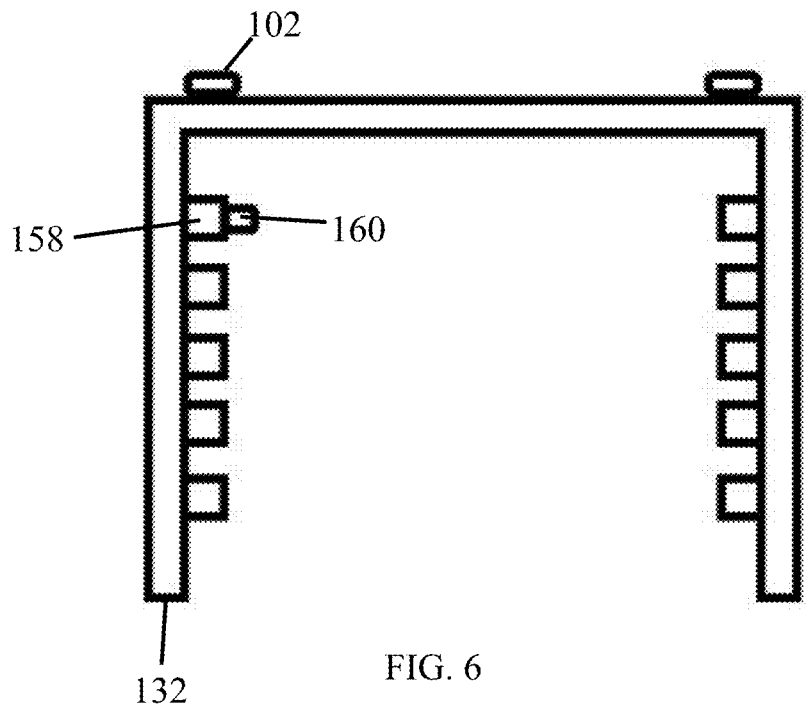
FIG. 6 is a top view thereof.
Figure 7:
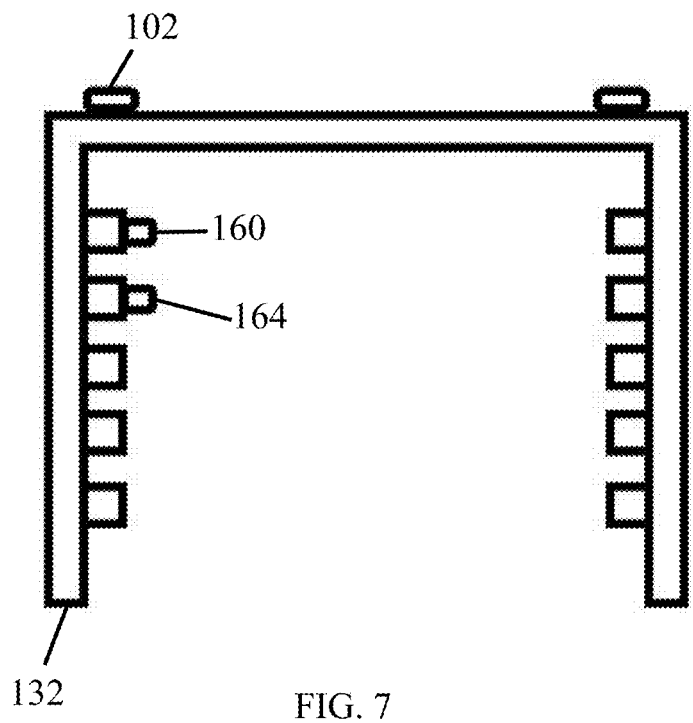
FIG. 7 is a top view thereof.
Figure 8:
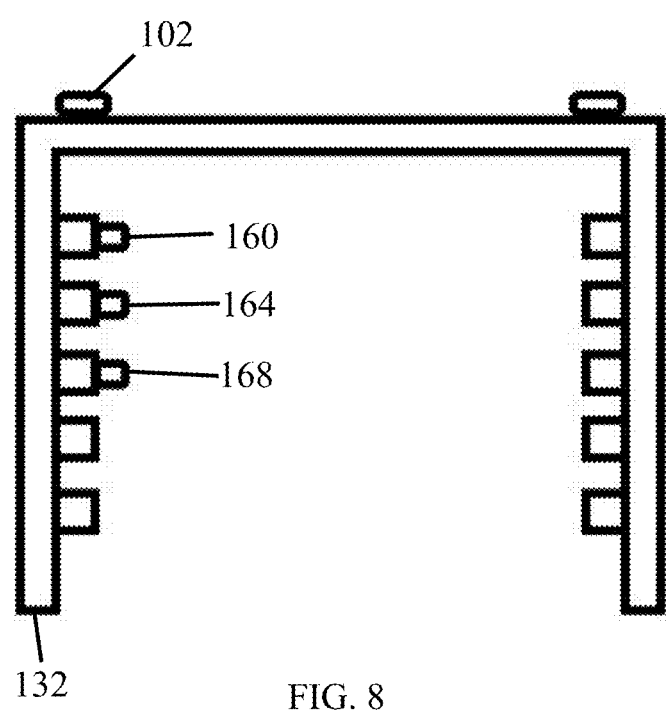
FIG. 8 is a top view thereof.
Figure 9:
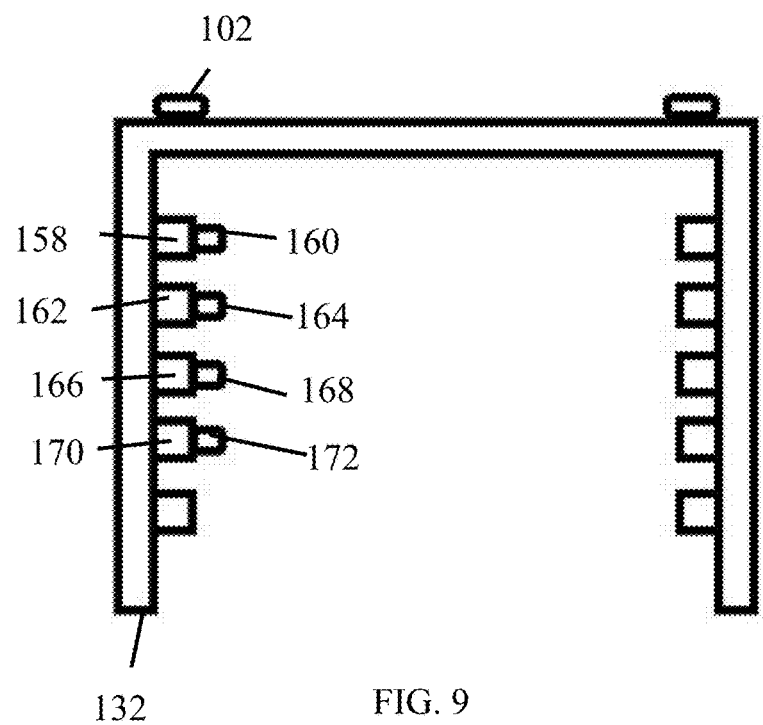
FIG. 9 is a top view thereof.
Figure 10:
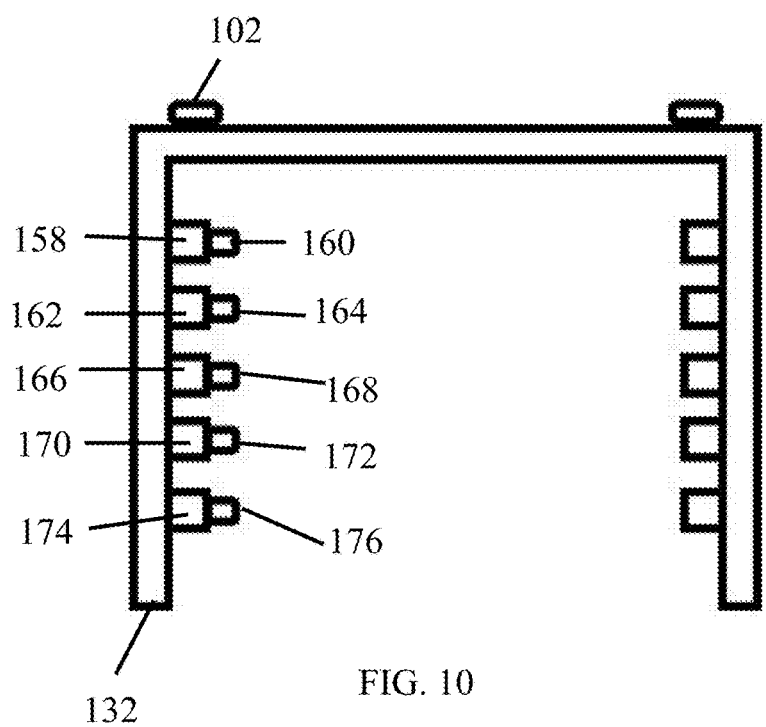
FIG. 10 is a top view thereof.

In one embodiment, the stimulator finger in the detected position extends outward from the stimulator to contact the user. The stimulator finger retracts into the stimulator when the stimulator finger is in the clear position. FIG. 5 shows the stimulator finger 160 retracted into stimulator 158 for the clear position. FIG. 6 shows the stimulator finger 160 in the detected position extending outward from stimulator 158. In another embodiment, the positions may be reversed such that the stimulator finger in the detected position is retracted into the stimulator.

The stimulators of one embodiment of the present invention may be constructed from solenoids, servo motors, LRAs, or other devices that can be used to apply pressure or produce a haptic feedback to an object to create contact with the user. The stimulator control 106 applies power to the stimulator according to the specified ranges to activate the stimulator. Activating the stimulator causes the stimulator finger to adjust to the detected position to contact the user or activates the actuator to produce a haptic effect. The pressure and/or haptic effect applied to the user warns the user of the detected object and the distance to the detected object.

In one embodiment, a set of five stimulators are attached to each stem of a pair of glasses which apply a haptic effect and/or slight pressure to the user as the user approaches an object for the detected feedback. Each stimulator represents one foot. The set of stimulators on the left stem represents objects detected in the user's left periphery. The set of stimulators on the right stem represents objects detected in the user's right periphery.

For example, if a user directly approaches a solid block wall, the user will experience a slight sensation from the stimulators closest to the user's eyes on both sides at a distance of five feet from the wall. As the user approaches the wall, each subsequent stimulator on both stems will energize incrementally every foot that the user approaches the wall. The pressure of each subsequent stimulator informs the user that the user is one foot closer to the wall. If the user continues towards the wall, the fifth and final stimulator will energize to apply pressure to the user which indicates that the user is almost in contact with the wall. If the user then walks backwards from the wall, the stimulators would de-energize in order at one foot increments until none of the stimulators were contacting the user's face. The user would then know that he was at least five feet away from the wall.

All of the stimulator fingers shown in FIG. 5 are in the clear position in which the stimulator fingers are retracted into the appropriate stimulators. In this embodiment, stimulators 158, 162, 166, 170, 174 activate according to objects detected by sensor 102. Such a relationship between sensor 102, stimulator set 157, and stimulators 158, 162, 166, 170, 174 enables a user to quickly associate the activation of such stimulators with the detection of an object towards the right portion of the user's field of vision. Sensor 104 controls stimulators 138, 142, 146, 150, 154. Likewise, the relationship between sensor 104, stimulator set 137, and stimulators 138, 142, 146, 150, 154 enables a user to quickly associate the activation of such stimulators with the detection of an object towards the left portion of the user's field of vision. In another embodiment, one sensor can distinguish the different sides such that the stimulator control can activate stimulators on both sides.

FIGS. 5-10 show the process of alerting a user to an object. The object may be approaching the user and/or the user may be approaching the object. As shown in FIG. 5, the sensor 102 has not detected an object within range. As the user becomes closer to the object, the first stimulator 158 adjusts the stimulator finger 160 into the detected position as shown in FIG. 6. The stimulator finger 160 contacts the user at the first contact point. Such contact warns the user that an object has been detected towards the left portion of the user's field of vision.

As the distance between the user and the detected object decreases, more stimulators are activated to contact the user. FIGS. 7-10 show the activation of the additional stimulator fingers 160, 164, 168, 172, 176 to the detected position to warn the user of the object. As shown in this embodiment, the stimulators remain in the detected position as the distance between the user and the object decreases. Each additional stimulator finger adjusted to the detected position warns the user that the distance between the user and the object has decreased. As indicated in FIGS. 5-10, the stimulator fingers adjust to the detected position in an approximately linear manner starting from the temple towards the ear.

Figure 11:
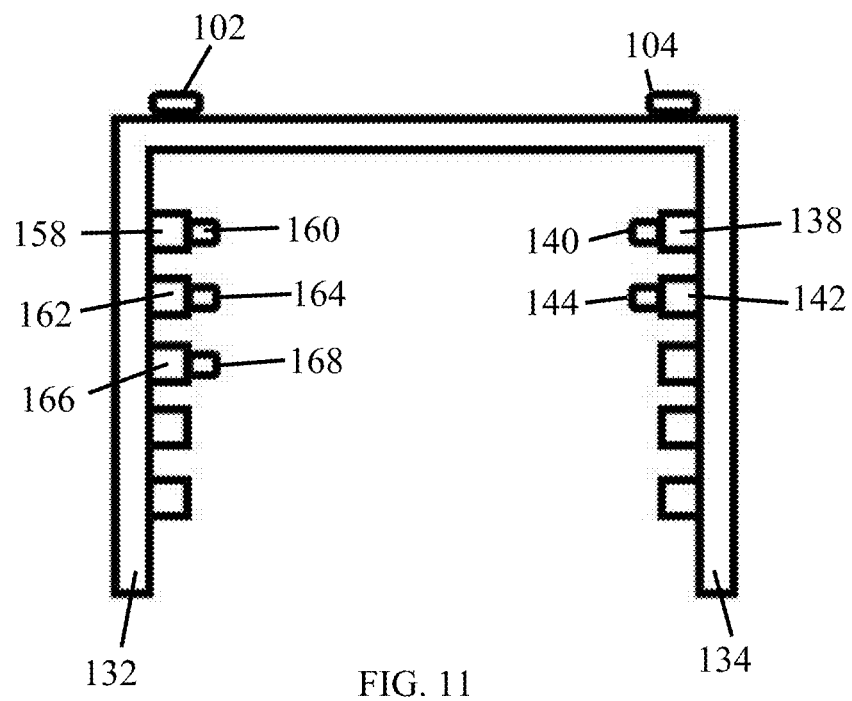
FIG. 11 is a top view thereof.
Figure 12:
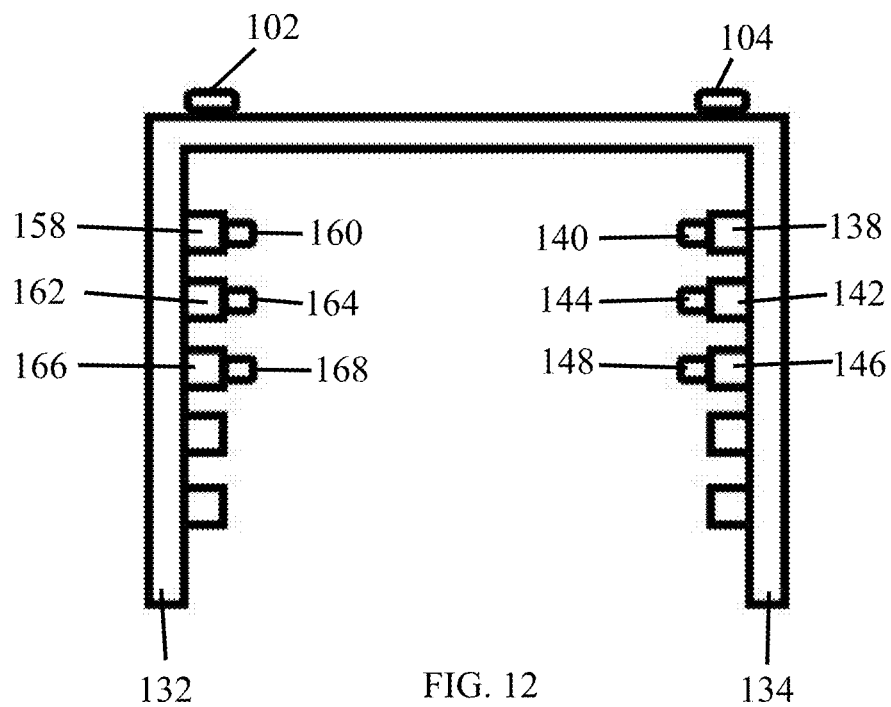
FIG. 12 is a top view thereof.

FIGS. 11 and 12 show the object detection device's ability to increase the amount of information relayed to the user. Sensors 102, 104 provide the information needed to activate stimulator fingers 140, 144, 160, 164, 168. Sensor 102 provides information regarding objects toward the left portion of the user's field of vision. Sensor 104 provides information regarding objects toward the right portion of the user's field of vision. The stimulators act according to the information provided by the appropriate sensor. FIG. 12 shows an embodiment in which the user could be approaching a centrally located object that has triggered both sensors 102, 104.

Figure 13:
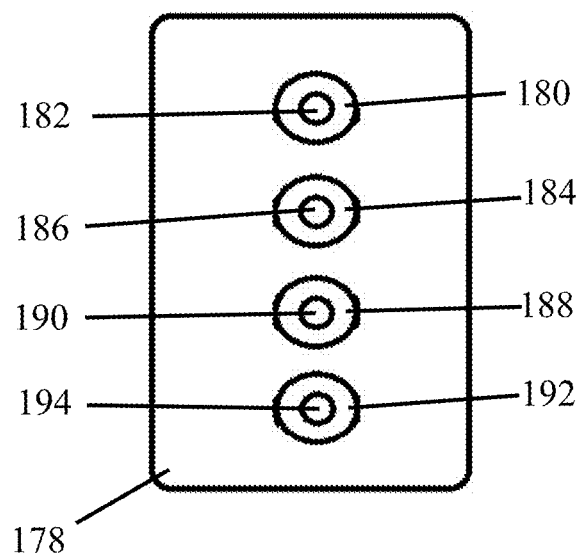
FIG. 13 is a rear view thereof.
Figure 14:
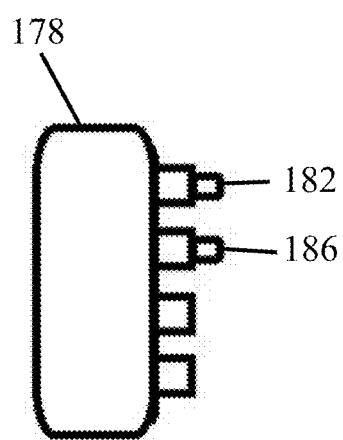
FIG. 14 is a side view thereof.

FIGS. 13-14 show another embodiment of the stimulators of the object detection device 178. The stimulators 180, 184, 188, 192 of this embodiment are not mounted on glasses. Instead, the stimulators 180, 184, 188, 192 are mounted in an approximately linear fashion to inform the user of the distance of the objects. Object detection device 178 may be configured on a housing that can be attached to the user. The object detection device 178 may be attached to a user's hat, an arm band, clothing, belt, or other clothing. The object detection device 178 may be attached by a clip or other known fastener to the user. The sensors may be included in the housing of the object detection device 178. The sensors may also be mounted elsewhere such as on the user, on a vehicle, etc. The sensors then communicate with the stimulators via a wired connection or wirelessly.

Figure 15:
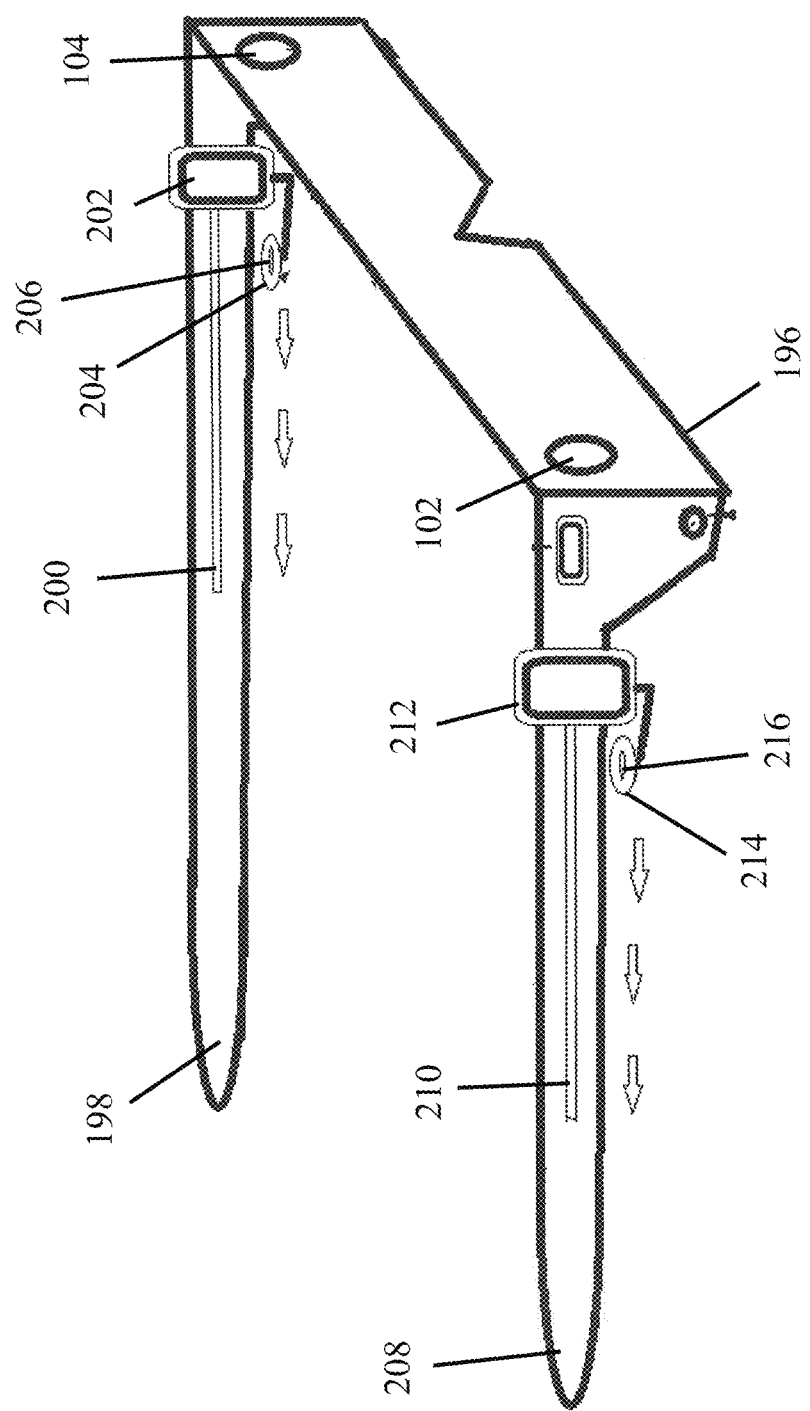
FIG. 15 is a perspective view of one embodiment of the present invention.

FIG. 15 shows another embodiment of the object detection device 196 in which a stimulator transport 202, 212 is used to notify the users of the distance of the object. As the distance between the user and the object decreases, the stimulator transport 202, 212 travels along path 200, 210 towards the user's ear. Each path 200, 210 is located on the stems 198, 208. The movement of the stimulator transport 202, 212 depends on the rate at which the distance between the user and the object changes. If the distance is increasing, the stimulator transport 202, 212 travels toward the user's temple. In another embodiment, the path may be reversed such that the stimulation transport travels toward the temple as the distance to the detected object decreases and the stimulation transport travels toward the ear as the distance to the detected object increases.

If a user detects an object with only one sensor 102, 104 the user will feel the stimulator 204, 214 along the side that the object is on in relation to the user. The user can utilize the simulators 204, 214 and stimulator fingers 206, 216 to determine object(s) position and proximity to the user, the speed at which the object is travelling and/or the user is approaching the object.

The stimulator transport 202, 212 travels toward the user's ear according to a scaled distance similar to the range at which a user is alerted to the object. The formula for calculating movement of the stimulator transport 202, 212 may be defined as follows:

P_Stimulation=Position of stimulation transport
D_Path=Distance of Path
D_Obj=Distance of Object
D_Range=Distance to Begin Alerting User $$P\_Stimulation=(D\_Path/D\_Range)*(D\_Range-D\_Obj)$$

For example, if the object detection device 196 has a path 200, 210 with a distance of 2 inches and the object detection device 196 starts alerting the user at five feet (sixty inches), the formula will be as follows:

$$P\_Stimulation=(2\ inches/60\ inches)*(60\ inches-D\_Obj)$$

In such an example, position of the stimulator finger 206, 216 will be as follows:

| Distance of Object | Position of Stimulator finger |
|---|---|
| 60 | 0 |
| 52.5 | 0.25 |
| 45 | 0.5 |
| 30 | 1 |
| 15 | 1.5 |
| 7.5 | 1.75 |
| 0 | 2 |

Such an embodiment provides scaled movement so that the user has more accurate information regarding the distance of the object. Another benefit of the stimulator transport is that the stimulator transports move in relation to the object. This benefit allows the user to gain an understanding at the rate of change of distance between the user and the object (e.g. the speed at which the object is approaching user and/or the speed at which the user is approaching the object).

In another embodiment, the object detection device could use sensors arranged in different configurations. The sensors may be oriented in any number of ways to give the user a sense of detecting objects not in the user's field of invention. The sensors could be placed behind the user or to the side in areas that would not be in the user's field of invention. This would allow the user to have a sense of having eyes in the back of his head. Such configurations could be useful for police, military, drivers, pilots, etc. A video game system could use an embodiment of the present invention to represent virtual things, objects, or situations for entertainment value. The preset invention could also be reconfigured to provide the user with information in a circular motion or any other motion or series of motions.

Another embodiment of the object detection device may be paired with a smart phone or GPS system that allows tracking of the user. The GPS system would allow the user to be updated with the user's actual location. The object detection device could inform the user of the user's current location. The object detection device could also identify addresses and buildings to the user. The GPS system could also warn the user when the user will be crossing the street and inform the user of crosswalks to cross the street.

Figure 16:
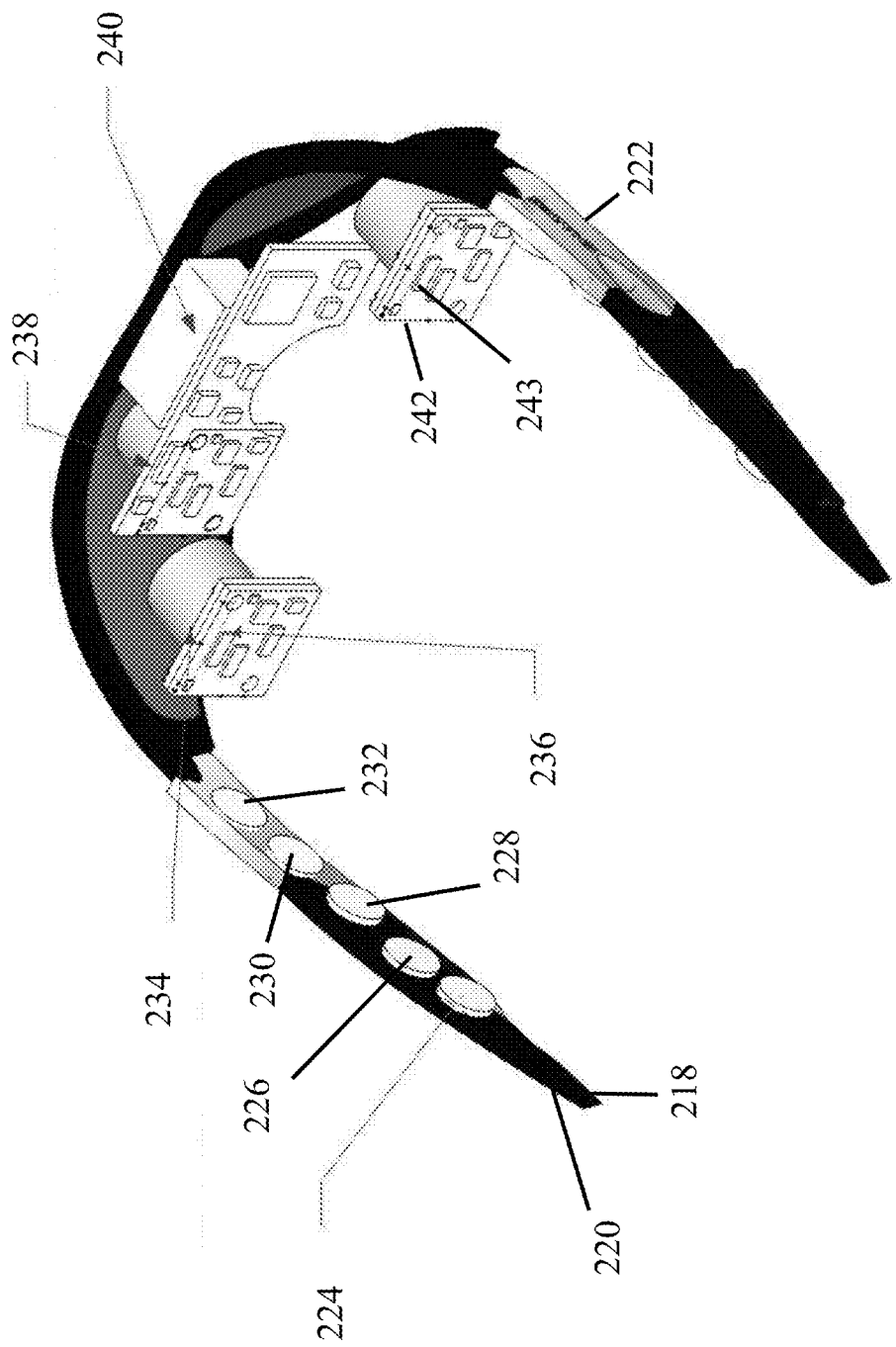
FIG. 16 is a perspective view of one embodiment of the present invention.

FIG. 16 shows another embodiment of the present invention that uses stimulators 224, 226, 228, 230, 232, such as haptic feedback devices. These haptic feedback devices may be the stimulators described above, Linear Resonator Actuators (LRAs), contact devices, servo motors, solenoids, etc. These actuators may be activated to a detected effect indicating that an object has been detected within the distance range. The detected effect may be producing a haptic effect such as a haptic feedback. The actuator may also produce a clear feedback indicating that an object has not been detected a particular distance assigned to the actuator. In one embodiment, the clear feedback may be that the actuator produces no feedback.

One embodiment of the present invention uses ultrasonic sensors and a special class of haptic feedback devices called Linear Resonant Actuators (LRAs) to provide a limited 3D view of the world. The LRAs provide touch feedback indicating distance to and location of an object.

The object detection device allows for sensor evaluation. The LRAs, the haptic feedback device, stimulators are located in the glasses 218 at stems 220, 222. The haptic feedback devices 224, 226, 228, 230, 232, such as the stimulators, LRAs etc. are installed in multiple locations along the stems 220, 222 of the glasses 218. The stimulators, LRAs, of one embodiment, are disks 248 that are approximately 10 mm in diameter and approximately 3.6 mm thick.

These haptic feedback devices may be mounted in the stems 220, 222 such that the operation of the individual LRA can be discerned by the wearer without being confused with the actuation of other LRAs, such as the adjacent LRAs, located in the glasses stem 220, 222.

The object detection device includes a number of important subsystems in addition to the stem/LRA assemblies. The glasses frame 218 integrates multiple ultrasonic sensors 234, 242. The sensors 234, 242 sense objects at a set distance. In one embodiment, the sensors 234, 242 sense objects up to 6 feet away with an angle of coverage of 30 degrees. Other embodiments may implement sensors that provide different coverage with different distances and different angles of coverage.

Figure 19:
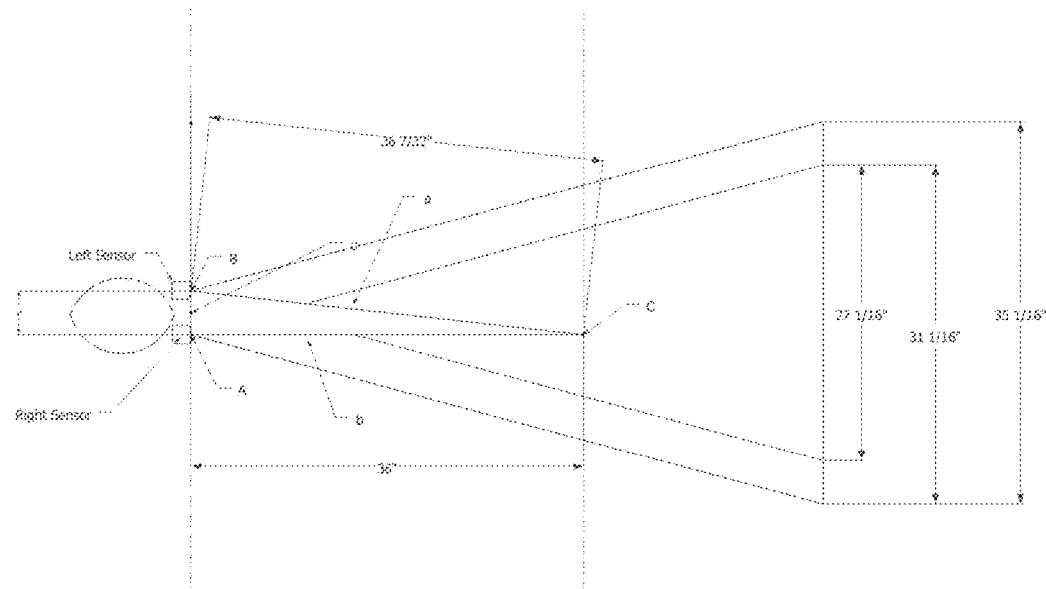
FIG. 19 is a top environmental view of one embodiment of the present invention.
Figure 20:
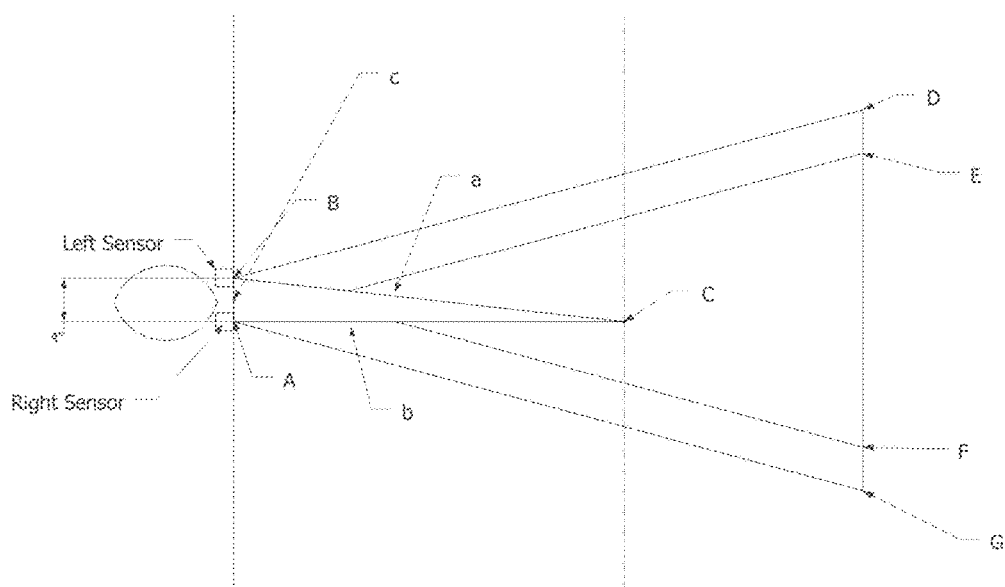
FIG. 20 is a top environmental view thereof.

Referring to FIGS. 19 and 20, sensors 234, 242 are spaced horizontally apart such that the sensors 234, 242 provide different areas of coverage. However, the sensors 234, 242 provide coverage that overlaps in set areas. In these areas of overlap, the system can determine the location and distance of the object. In the areas that do not overlap, such as areas in which only sensor 234 or sensor 242 detect an object, the system may provide distance to the object.

Continuing to refer to FIG. 20, a point object is located a point C in the figure. The two sensors and the object form a triangle with angles A, B and C and with sides (opposite those angles) a, b and c. Since the left sensor can measure the distance to the object giving side a of the triangle and the right sensor also measures the distance to the object giving us the triangle side b. Side c of the triangle represents the distance separating the left and right sensors. In this case, the distance is about 100 mm (4 inches). To determine the exact location of the object, the object detection device must apply trigonometric rules to calculate the triangles angles and thus the location left or right of the centerline between the sensors. Use the following to solve for angles B and A, given distance a and b (from the sensors).

The cosine rule is used to calculate the angle A. The sine rule is then used to calculate angle B. We can now apply these rules again to find the azimuth of the detected object from the point mid way between the two sensors. The object detection device now knows the distance and azimuth of any detected object.

A third sensor may be implemented in the object detection device to provide an additional reference for triangulating the position of objects so that the distance and elevation of the object may be determined. The third sensor enables the system to locate objects in terms of distance, elevation, and azimuth. The third sensor may be connected to a separate set of haptic feedback devices to inform the user of the information acquired through the third sensor. In another embodiment, the LRAs may be programmed to function in a different manner dependent upon the information to be relayed by the third sensor.

Figure 21:
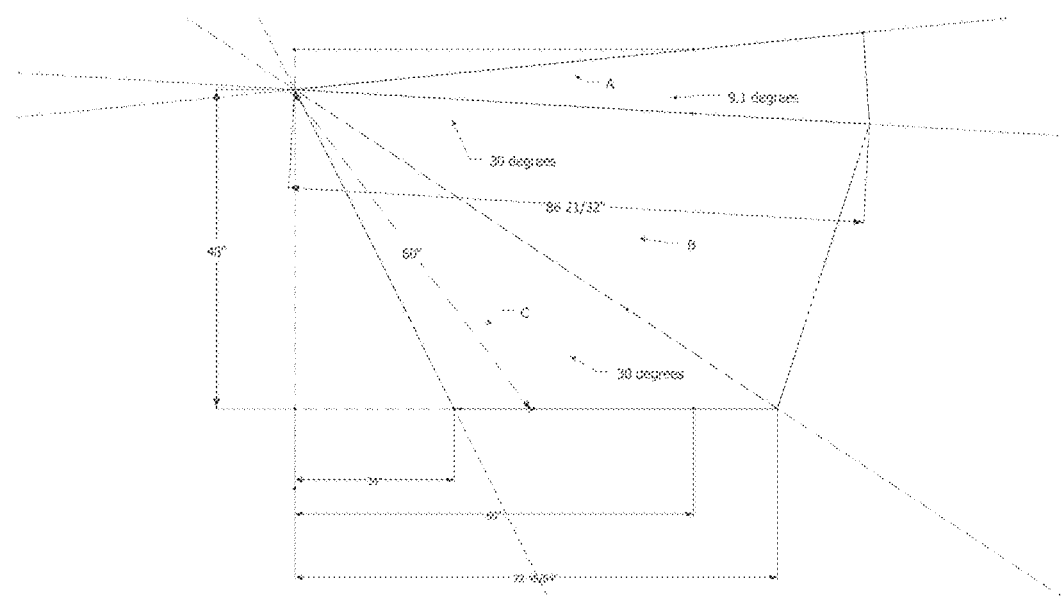
FIG. 21 is a side environmental view thereof.

FIG. 21 shows a side view of the view shown in FIGS. 19 and 20. The vertical coverage is somewhat limited requiring the user to scan vertically with the device to acquire additional information regarding the vertical orientation of a detected object.

Figure 22:
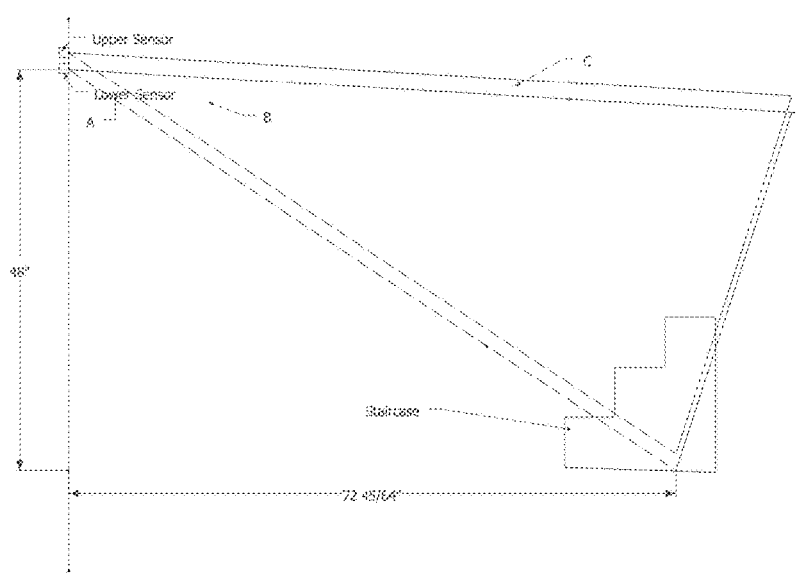
FIG. 22 is a side environmental view thereof.

To resolve the issue with detecting objects vertically, FIG. 22 illustrates how the third sensor located vertically above or below, such as one inch above or below the horizontal sensors, used to both measure distance and locate objects in elevation. The device provides both an upper sensor 272 and lower sensor 274. One of these sensors is one of the horizontal plane sensors, such as sensor 234, 242. The vertically displaced sensor is a sensor located vertically above or below sensor 234, 242. In one embodiment, the vertical sensor 272, 274 may be placed above or below sensor 234, 242. The sensors detect objects within three regions, region A 276, region B 278, and region C 280. Region B 278 is covered by both sensors 272, 274 while Regions C is covered only by the upper sensor 242 and region A 276 is covered only by the lower sensor 274.

Objects are located in distance by using the direct measurements from the upper sensor 272 and lower sensor 274. Object elevation is obtained using the same trigonometric functions discussed earlier. Another embodiment of the object detection device may provide accelerometers and gyros that may be considered in calculating the elevation of an object. The device considers these accelerometers and gyros to better inform the user of changes in elevation that the user may want to consider.

The system may also inform the user of certain hazards, including but not limited to changes in elevation, stairs, curbs, etc. The system of one embodiment considers the height and angle of the sensors when calculating the height of the object. The system informs the user of the height by providing a height feedback and/or hazard feedback indicating that the user is approaching a change in ground level detected by the vertical sensors. The height feedback and/or hazard feedback may be performed by the actuator of by an audio feedback. In one embodiment, the height and/or hazard feedback may be distinguishable from the other feedbacks so that the user may distinguish the height and/or hazard feedback. For example, one embodiment provides different types of feedback for each type of detection so that the user may have an understanding of the detections and may distinguish the types of detections made by the system due to the provided feedback.

Figure 23:
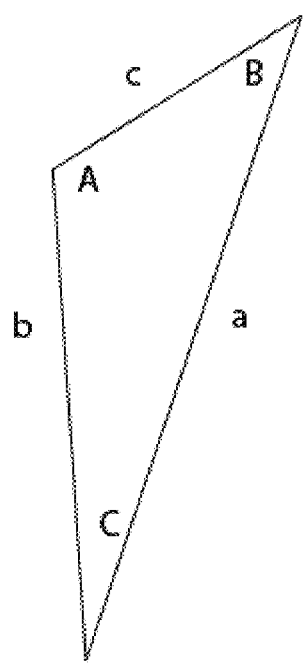
FIG. 23 is a view of one detection of one embodiment of the present invention.

Navigation using ultrasonic sensors requires the use of trigonometry for calculating object locations as shown in FIG. 23. Triangle 282 with angles A, B, and C with sides a, b, c. By convention, side a is opposite angel A, side b is opposite angel B, and side c is opposite angle C. Three identities are required to solve the triangle. The required identities are:

A. Sum of Internal Angles Equals 180 Degrees.

$$A+B+C=180 \text{degrees}.$$

B. Sine Rule:

$$a/\sin A = b/\sin B = c/\sin C$$

C. Cosine Rule:

$$a^2 = b^2 + c^2 - 2*b*c*\cos A$$

$$b^2 = a^2 + c^2 - 2*a*c*\cos B$$

$$c^2 = a^2 + b^2 - 2*a*b*\cos C$$

To solve for an angle given the length of each of the three sides, the cosine rule is rewritten as:

$$\cos C = (a^2 + b^2 - c^2)/(2*a*b)$$

then:

$$C = \cos^\wedge(-1)(a^2 + b^2 - c^2)/(2*a*b)$$

In object location determination, the device solves a triangle given the lengths of the three sides. One side is given as the distance separating the two sensors. The other two sides are the distance measurements may by the sensors.

The system solves one of angles A, B, C using the cosine rule as described above. The system then uses the sine rule to solve a second angle. For example, after solving C, the system can determine A as:

$a/\sin A = c/\sin C$ such that:

$\sin A = (a \sin C)/C;$ $A = \sin^{-1}(a*\sin C)/c$

Knowing two angles and that the sum of the angles must equal 180 degrees, the device solves the third angle. Given A and C then:

$B = 180 \text{ degrees} - A - C$

The object detection device provides information regarding the location of a detected object in a three dimensional space in terms of azimuth and elevation. The object detection device defines a detected object in a three dimensional space in terms of x, y, and z coordinates. If the x, y plane represents the floor, for example, then define the viewer (or ultrasonic sensor in our case) as located at a particular point (x, y, z). That is, it is located x units along the x axis and y units along the y axis (this defines its location with respect to the floor). The object is also located z units along the z axis. The z axis of one embodiment measures the distance from the floor.

In one embodiment, the location of the sensor is defined as the origin (0, 0, 0). The value of x increases to the right and decreases to the left. An object detected in front of the sensor and to the right of the sensor will have positive values of x and y. An object detected to the left of the sensor and in front of the sensor will have positive values of y and negative values of x. A point above the floor will be indicated by a positive z value.

The Azimuth angle is a convenient way of specifying location in the x, y plane. Azimuth is simply the angle on the x,y plane between 0 and plus or minus 90 degrees. Elevation is the angle between the x, y plane and the location of the object in the z plane. Azimuth provides information regarding the angle to a detected object to the left or right of the sensor. Elevation provides the user with the height above the x,y plane (the floor) of the detected object.

Encoding Distance

There are numerous methods and combinations of methods for encoding distance information for the object detection device. The following table provides an example of a simple positional encoding of one embodiment. Distance varies from approximate one foot (30 cm) to approximately six feet (180 cm). Note that no distance is measured in the closest 30 cm of such an embodiment. The actuator is activated to produce a detected effect (i.e., detected position, touches the user, produce haptic feedback) when a "1" is indicated in the column. This encoding schema allows a resolution of 30 cm per step (about 1 foot). Thus, such a user of such an embodiment of the present invention can determine the distance to the nearest object to the nearest foot.

| Distance (cm) | Actuator 1 | Actuator 2 | Actuator 3 | Actuator 4 | Actuator 5 |
|---|---|---|---|---|---|
| 0-30, | 0 | 0 | 0 | 0 | 0 |
| 31-60 | 1 | 0 | 0 | 0 | 0 |
| 61-90 | 0 | 1 | 0 | 0 | 0 |
| 91-120 | 0 | 0 | 1 | 0 | 0 |
| 121-150 | 0 | 0 | 0 | 1 | 0 |
| 151-180 | 0 | 0 | 0 | 0 | 1 |

This encoding schema establishes a fixed maximum range for making a measurement, 180 cm or 6 feet for this embodiment. With the appropriate control device, it is possible to allow the user to adjust this range. Adjustment of the range might be particularly important when transitioning from an indoor to an outdoor environment.

Actuator 1 may be located towards the front of the stem towards the lens and sensor. In another embodiment, actuator 1 may be located towards the back of the stem. The activation of the actuators can be defined by the individual user. Five actuators of one embodiment will be located on each temple piece and provide feedback for either the left or right field of view.

More complex encoding schemes are possible by using combinations of actuators to indicate a specific distance. One example of a more complex encoding is shown in the table below. This encodiment is an example of a simple binary encoded distance indication. That is, each actuator represents a power of 2 with 5 actuators providing 232 possible measurement values.

This encoding schema allows a resolution of 6 cm per step (about 2⅜ inches). That is, the user of the object detection device can determine the distance to the nearest object within approximately two inches.

| Distance (cm) | Actuator 1 | Actuator 2 | Actuator 3 | Actuator 4 | Actuator 5 |
|---|---|---|---|---|---|
| 0-6 | 0 | 0 | 0 | 0 | 0 |
| 7-13 | 0 | 0 | 0 | 0 | 0 |
| 14-20 | 0 | 0 | 0 | 0 | 0 |
| 21-27 | 0 | 0 | 0 | 0 | 0 |
| 28-34 | 0 | 0 | 0 | 0 | 0 |
| 35-41 | 1 | 0 | 0 | 0 | 0 |
| 42-48 | 0 | 1 | 0 | 0 | 0 |
| 49-55 | 1 | 1 | 0 | 0 | 0 |
| 56-62 | 0 | 0 | 1 | 0 | 0 |
| 63-69 | 1 | 0 | 1 | 0 | 0 |
| 70-76 | 0 | 1 | 1 | 0 | 0 |
| 77-83 | 1 | 1 | 1 | 0 | 0 |
| 84-90 | 0 | 0 | 0 | 1 | 0 |
| 9-97 | 1 | 0 | 0 | 1 | 0 |
| 98-104 | 0 | 1 | 0 | 1 | 0 |
| 105-111 | 1 | 1 | 0 | 1 | 0 |
| 112-118 | 0 | 0 | 1 | 1 | 0 |
| 119-125 | 1 | 0 | 1 | 1 | 0 |
| 126-132 | 0 | 1 | 1 | 1 | 0 |
| 133-139 | 1 | 1 | 1 | 1 | 0 |
| 140-146 | 0 | 0 | 0 | 0 | 1 |
| 147-153 | 1 | 0 | 0 | 0 | 1 |
| 154-160 | 0 | 1 | 0 | 0 | 1 |
| 161-167 | 1 | 1 | 0 | 0 | 1 |
| 168-174 | 0 | 0 | 1 | 0 | 1 |
| 175-181 | 1 | 0 | 1 | 0 | 1 |
| 182-188 | 0 | 1 | 1 | 0 | 1 |
| 189-195 | 1 | 1 | 1 | 0 | 1 |
| 196-202 | 0 | 0 | 0 | 1 | 1 |
| 203-209 | 1 | 0 | 0 | 1 | 1 |
| 210-216 | 0 | 1 | 0 | 1 | 1 |
| 217-223 | 1 | 1 | 0 | 1 | 1 |
| 224-230 | 0 | 0 | 1 | 1 | 1 |
| 231-237 | 1 | 0 | 1 | 1 | 1 |
| 238-244 | 0 | 1 | 1 | 1 | 1 |
| 245-251 | 1 | 1 | 1 | 1 | 1 |

Other positional encoding possibilities also exist. For example, one positional notation code is the Gray code. With a Gray code, the change in distance from one distance slot to the next requires changing only a single actuator. However, multiple actuators are used to encode the actual positional value. The following table compares a Gray code with a simple binary code and shows the decimal equivalent.

| Decimal | Gray | Binary |
|---------|------|--------|
| 0 | 000 | 000 |
| 1 | 001 | 001 |
| 2 | 011 | 010 |
| 3 | 010 | 011 |
| 4 | 110 | 100 |
| 5 | 111 | 101 |
| 6 | 101 | 110 |
| 7 | 100 | 111 |

Note that all of the codes discussed above are positional in nature. However, the combination of five actuators can encode as few as 5 distance slots or as many as 32.

However, one embodiment implements LRAs that are capable of presenting additional information to the user. Our particular implementation provides each LRA with 123 different haptic effects. A haptic effect might be a tap, buzz, click, hum, etc. Thus, by using combinations or effects and different encoding schemes it is possible to provide significant more information than can be obtained using simple positional encoding.

In one embodiment, a left sensor 234 and a right sensor 242 acquires the information necessary to inform the user. A left and right Haptics Control module 236, 243 provides the electronics for controlling the individual LRAs. The Haptics Control modules 236, 243 connect through flexible printed circuits to the Processor module 238. The processor module 238 includes a microprocessor and a number of other sensor subsystems. The microprocessor of the present invention may be a high performance microprocessor, such as but not limited to a 32 bit microprocessor, a 64 bit microprocessor, etc.

The actuators may be activated similarly to the stimulator fingers described above. Because actuators may provide more information through the different haptic effects, the actuators provide a detected feedback when detecting an object and a clear feedback when detecting an object. In one embodiment, the actuator does not activate when providing the clear feedback.

A Power Module 240 is provided for managing system power and hibernation of the object detection device. One embodiment of the object detection device is battery powered. Other embodiments of the present invention may be powered by alternative sources.

Figure 17:
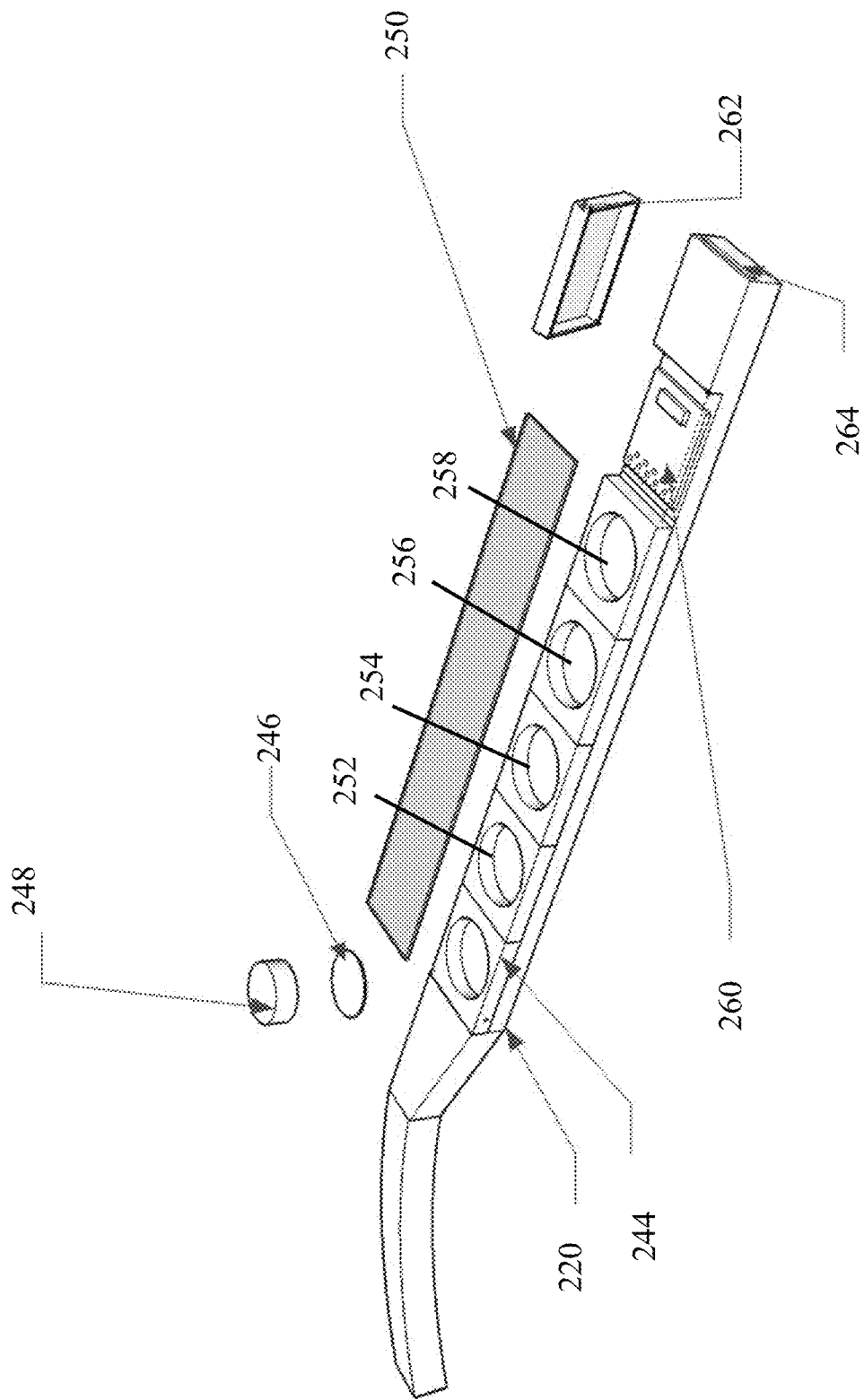
FIG. 17 is a perspective view of one portion of one embodiment of the present invention.
Figure 18:
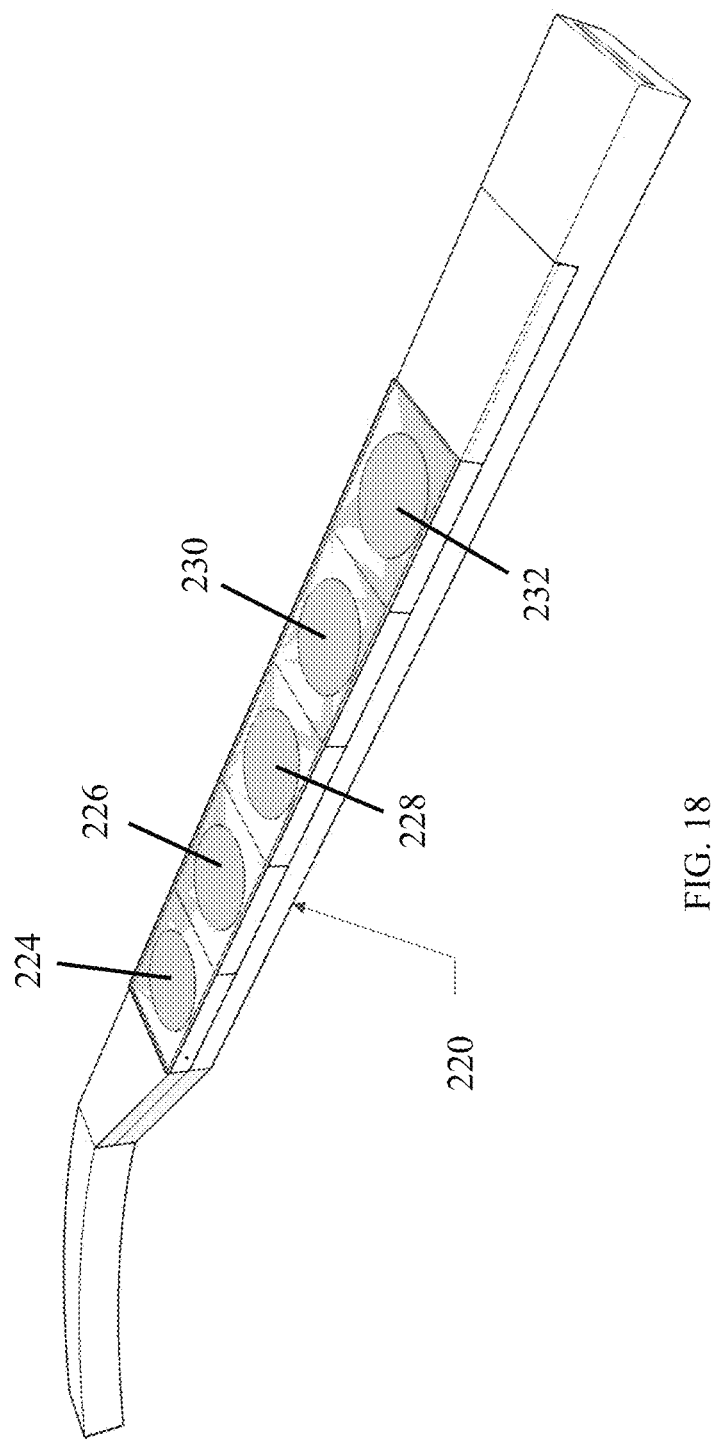
FIG. 18 is a perspective view thereof.

FIG. 17 is an exploded view of the stem 220 showing the stem construction, the components of the stem, and the mounting and installation of the LRAs 248 within the stems 220, 222. Each stem (both right and left) 220, 222 of one embodiment are constructed with 5 Linear Resonant Actuators (LRAs) 248. Each LRA 248 is mounted in an installation aperture 244, 252, 254, 256, 258 with an isolation pad 246 that mechanically isolates the LRA 248 movement for each device. The LRAs 248 connect to the LRA drivers which are located on a Haptics control module 236, 243 in the front assembly of the glasses 218. Each LRA 248 has two wire leads which are routed inside the body of the stem to the Stem Interconnect Module 260.

The mechanical design of one embodiment provides a mechanism for both holding the LRA 248 as well as isolating its effects from the glasses stem 220, 222. The haptic feedback from an LRA 248 must be discernible both in location and in touch effect. A vibrations isolation pad 246 provides this isolation. The pad 246 is secured to the stems 220, 222 to dampen the effect of the LRA 248 on the stems 220, 222 to isolate the effect of the LRA 248 to a single contact point on the user.

The Stem Interconnect Module 260 provides the transition between the LRA leads and a flexible printed circuit (FPC) connector 264. A FPC 264 connects the Stem Interconnect Module 260 with the appropriate Haptics control module 236, 243 through the glasses stem hinge.

A cover 250, such as an elastomeric cover is placed over the LRAs 248. Cover 250 provides a barrier between the user and the LRAs 248 such that the cover 250 contacts the user when the LRA is in the detected position.

FIG. 17 shows one embodiment of a stem of the present invention. Note that cover 250 prevents the LRAs 248 from touching the user's skin while transmitting the complete haptic effect. In another embodiment, the LRAs 248 may directly contact the user instead of the indirect contact created by cover 250.

In one embodiment, LRA 248 movement occurs in a single plane controlled by software. The processor 238 directs the activation of the LRAs 248 according to the information detected by sensors 234, 242. The processor 238, the software, and the LRAs 248 provide significant advantages over other mechanical vibratory actuators. Similar to the stimulator fingers, the actuators provide the detected feedback when an object is within a certain distance.

LRAs 248 installed in the glasses stem 220, 222 have significant capability. Other kinds of actuators are simple on/off devices. LRAs 248 provide many different types of haptic effects. In one embodiment, the LRAs 248 may provide up to 123 haptic effects using an on-chip library in each haptic driver integrated circuit. Haptic effects include effects such as click, click with ramp down, pulsing, ramp up with pulsing, bump, soft bump, buzz, etc. Haptic effects can be sequenced and modulated in terms of magnitude and duration.

Further, each haptic actuator can produce a different haptic effect if desired. Such features available through the haptic actuators provide a significant new capability in terms of providing haptic feedback indications of distance from a detected object.

Another embodiment of the present invention allows the user to program effects that are most suitable for his/her use and particular situation. Some users may need/want stronger effects, others more subdued effects. Some users may be capable of decoding more information using multiple effects, while other users may want simple effects providing simple encoding of distance.

Further, the haptic effects may be tuned to the particular glasses stem instantiation. Each stem instantiation may be best optimized using a different LRA effect. In one embodiment, the LRAs may be programmed in the different stem design/implementations to provide the best user experience.

The object detection device of the present invention also assists with a user's posture and gate. Many blind people and particularly those blind from birth have poor or improperly developed posture and gate. Some people may also exhibit awkward body movement. Proper posture is encouraged in sighted people because vision is improved when the head is held high. The eyes are level and information is gained by looking straight ahead or by scanning left to right and back or up and down. Since the 'image' of the physical world presented by the object detection device uses sensors mounted near the eye and oriented in the way that human eyes are oriented, the wearer must stand upright and hold his head upright in order to detect obstacles. Therefore, a wearer of the object detection device will improve his gate and posture thus improving the appearance. The object detection device will also assist with the socialization and integration of the user.

One embodiment of the present invention provides the ability to create a digital record of the sensor input data, the provided haptic feedback for that input data set, and a time stamp indicating when a particular data set was captured. This data will be valuable in analyzing use of the device and in detecting any problems with the device. The device may provide storage, including a hard drive, a flash drive, an SD cart slot for the card, and other digital storage, for storing such information. Any collected data will be stored to the storage and can then later be removed and analyzed.

A number of characteristics of the device can be customized to meet a particular wearer's preferences, such as maximum range, sensitivity, and the haptic effects. In some instances, users will want to adjust the maximum range of the glasses. One embodiment provides an indoor and an outdoor mode that changes the ranges at which objects are detected and changes the ranges from which the user is notified of the distance of a detected object. However, device allows the user to set the range as required.

The user also can set the sensitivity of the glasses to detect the location of the detected objects. In one embodiment, the device can inform the user of smaller distance increments such as 1 cm. In other cases, the user may be interested in larger distance increments such as 5 cm.

The user may also select the type of haptic effects for the device to use. Each LRA of one embodiment provides a library of 123 effects. Effects can be combined for a particular LRA and the intensity and duration of the effect determined by the wearer. The user can apply the same haptic effect to all LRAs or can specify a different effect for each LRA if desired. The user may also define different haptic effects based on an outdoor mode and an indoor mode so that the user can be made aware of the selected mode based upon the haptic effect.

The present invention may also utilize additional sensors and feedback devices to provide the user with additional information. Such sensors and feedback devices may include, but are not limited to the following.

Non-Contact Infrared Temperature Sensor for measuring ambient air temperature. Such sensors can assist with maintaining calibration of ultrasonic transducers across a wide temperature range. Such sensors may also monitor the temperature of individual components. Such a sensor installed in the device may include but is not limited to the TI TMP006 Non-Contact Infrared Temperature Sensor.

Other embodiments may also provide ambient temperature and humidity sensor. Such sensors may also monitor ambient temperature and calibrate ultrasonic transducers. Such a sensor installed in the device may include but is not limited to the Sensirion SHT21 Humidity and Pressure Sensor.

Other embodiments may provide a three-axis gyro that detects movement and motion of the device. The gyro with the three-axis accelerometer can detect head motion detection and measure tilt angle between the view angle and the horizon. The gyro can also provide dead-reckoning navigation to furnish the user with feedback on the current location. Such a gyro installed in the device may include but is not limited to the InvenSense MPU-9150: 9-axis MEMS motion tracking device.

Other embodiments may provide a three-axis accelerometer that detects movement and motion of the device. Such an accelerometer installed in the device may include but is not limited to the InvenSense MPU-9150: 9-axis MEMS motion tracking device.

Other embodiments may also provide a three-axis compass that detects movement and motion of the device. The compass aids the user in navigating his/her surroundings. Such a compass installed in the device may include but is not limited to the InvenSense MPU-9150: 9-axis MEMS motion tracking device.

Other embodiments may also provide a GPS position location processor for navigating the user in an outside environment. Use of GPS provides additional navigation capability for the user. The system may allow the user to mark particular locations, wherein such locations many include but are not limited to landmarks and hazards, with the GPS. The system could then inform the user as the user approaches the marked location. The system could then inform the user of the marked location with a special feedback from one of the actuators. The system could also inform the user of the marked location with an audio feedback informing the user of the marked location. Such feedback may be a marked location feedback, landmark feedback, and/or hazard feedback. The actuator and or audio device provides the user with the appropriate feedback. In one embodiment, the marked location feedback may be distinguishable from the other feedbacks so that the user may distinguish the marked location feedbacks. The system may also provide different feedbacks for the landmark feedback and the hazard feedback so that the user may distinguish each type of feedback. As stated above, one embodiment of the system may provide different types of feedback for each type of detection. The different feedbacks enable the user to identify the type of detection due to the distinguishable feedbacks provided to the user.

Other embodiments may also provide a barometric pressure sensor. The barometric sensor used in conjunction with GPS for navigation assists with altitude determination and sensor calibration. Such a barometric pressure sensor installed in the device may include but is not limited to the Bosch Sensortec BMP180 pressure sensor.

The present invention has been described as using approximately linear configurations of stimulators. The stimulators may be arranged horizontally, vertically, diagonally, or in other configurations. The stimulators may also be arranged in different configurations as long as the user is informed as to the meaning of the contact of a stimulator/actuator at a specific contact point.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An object detection device that alerts a user of a detected object, the object detection device mounted onto a pair of glasses, the device comprising:

a right stem of the glasses adjacent the right side of the user's head;
a left stem of the glasses adjacent the left side of the user's head;
a first sensor located on the glasses, the first sensor configured to detect an object in a first region towards the right portion of the user's field of vision;
a second sensor located on the glasses, the second sensor configured to detect an object in a second region towards the left portion of the user's field of vision, wherein the first region at least partially overlaps the second region at an overlap region, wherein the first sensor detects areas in a rightward region not detected by the second sensor, the second sensor detects areas in a leftward region not detected by the first sensor;
wherein the first sensor and second sensor are located at different vertical positions on the glasses;
a first actuator producing a detected feedback with a haptic effect directed to the right side of the user's head when the first sensor detects the object with a first distance from the first sensor, the first actuator located on the right stem of the glasses adjacent the right side of the user's head;
a second actuator producing a detected feedback with a haptic effect directed to the right side of the user's head when the first sensor detects the object with a second distance from the first sensor; the second actuator located on the right stem of the glasses adjacent the right side of the user's head;
a third actuator producing a detected feedback with a haptic effect directed to the left side of the user's head when the second sensor detects the object with the first distance from the second sensor, the third actuator located on the left stem adjacent the left side of the user's head; a fourth actuator producing a detected feedback with a haptic effect directed to the left side of the user's head when the second sensor detects the object with the second distance from the second sensor, the fourth actuator located on the left stem adjacent the left side of the user's head.

2. The device of claim 1 further comprising:
a computing device determining the distance of the object from the first sensor for the object detected in the overlap region, the computing device activating the first actuator to produce the detected feedback to inform the distance of the object from the first sensor;
the computing device determining the distance of the object from the second sensor for the object detected in the overlap region, the computing device activating the second actuator to produce the detected feedback to inform the distance of the object from the second sensor.

3. The device of claim 2 further comprising:
the computing device determining the location of the detected object within the overlap region;
the actuator informing the user of the location of the detected object within the overlap region.

4. The device of claim 1 wherein the first sensor and second sensor are mounted on the glasses to remain a fixed distance from the user.

5. The device of claim 1 wherein at least one of the actuators produces more than two haptic effects as feedback for detecting the object.

* * * * *